April 12, 1932.　　　R. W. BRIGGS ET AL　　　1,853,035
SCRAPER FOR SUBGRADING MACHINES
Original Filed May 3, 1930　　2 Sheets-Sheet 1
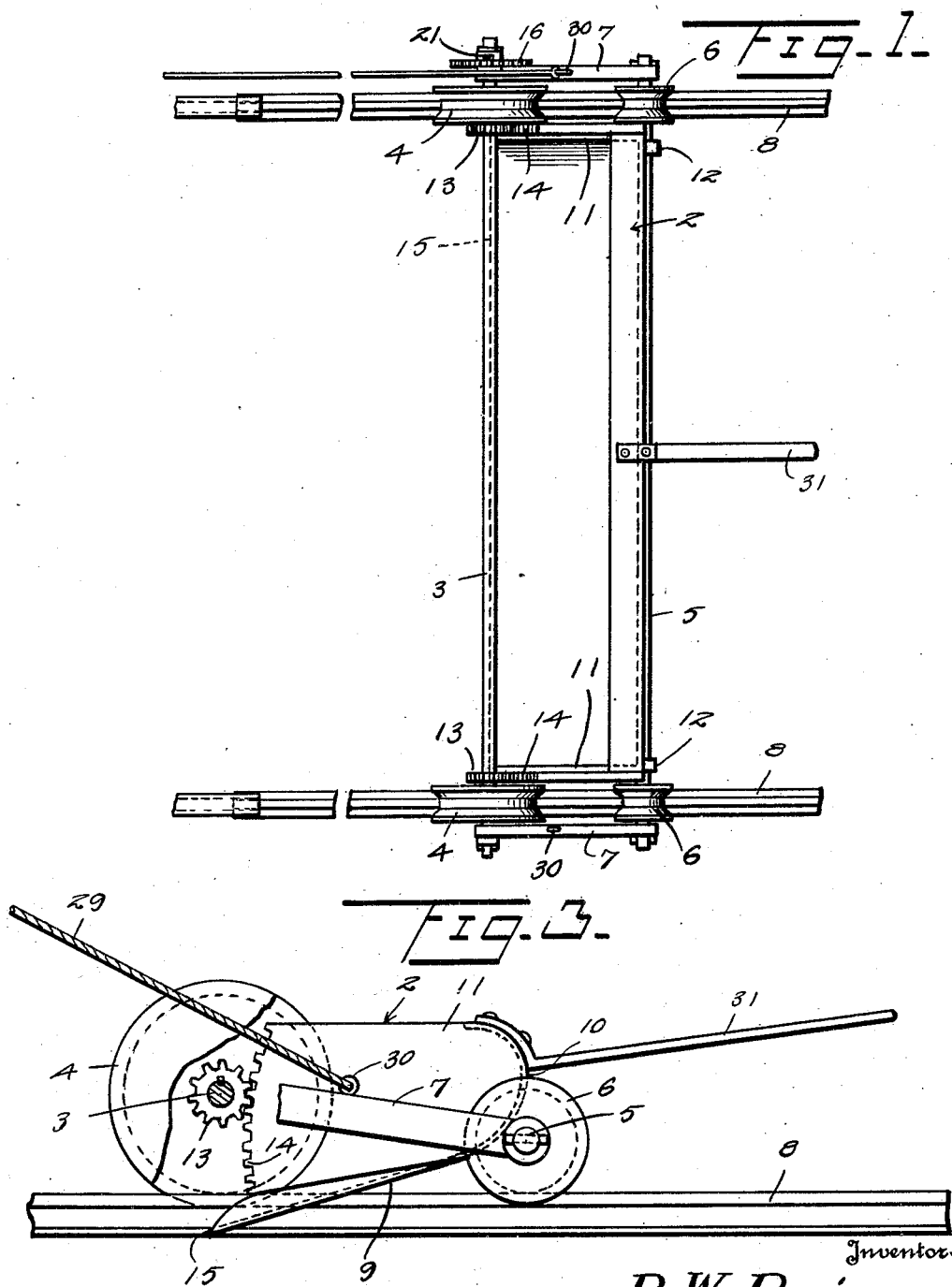
Inventors
R. W. Briggs
J. N. Summers
By Watson E. Coleman
Attorney

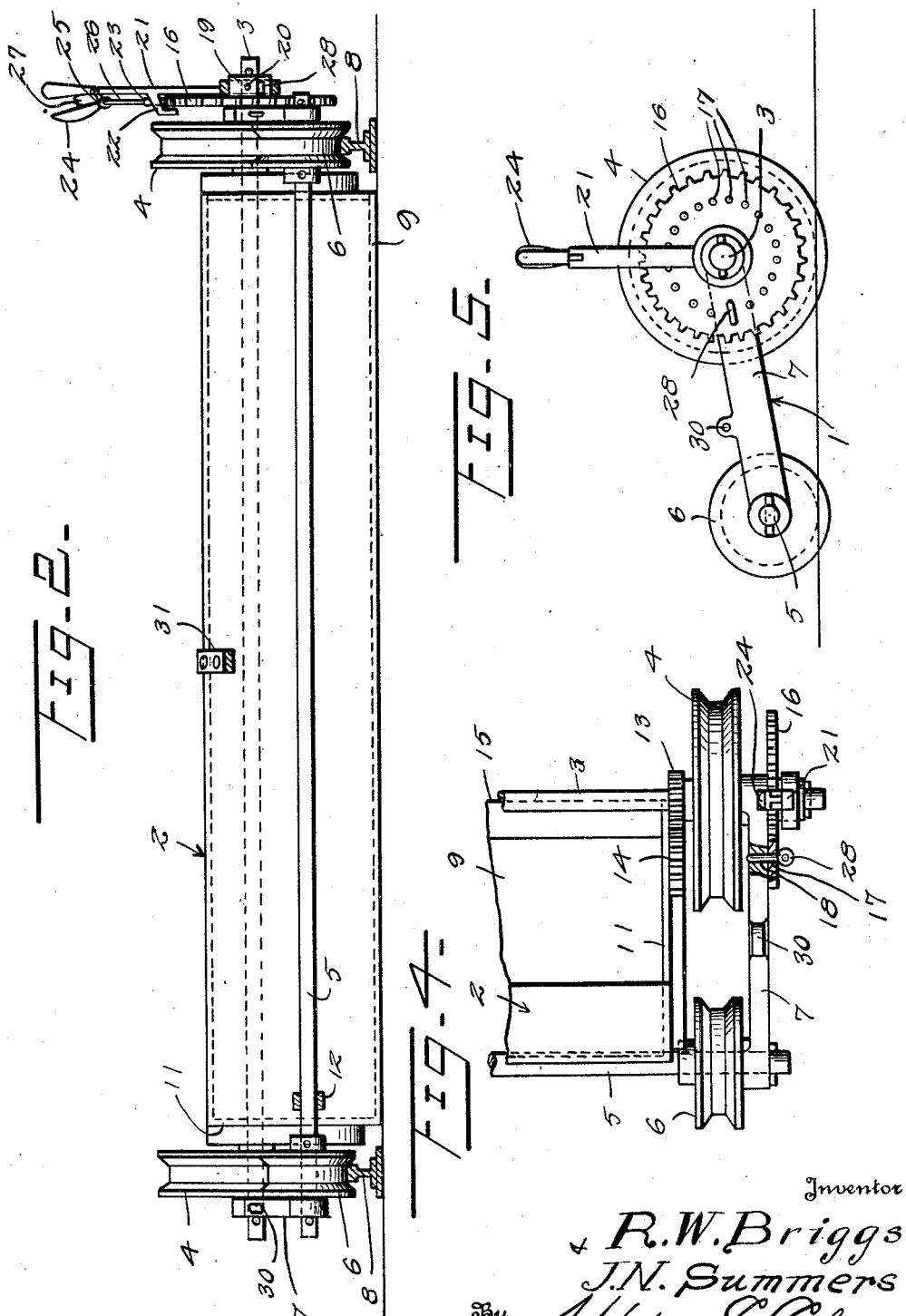

Patented Apr. 12, 1932

1,853,035

UNITED STATES PATENT OFFICE

ROBERT WEBB BRIGGS AND JOE N. SUMMERS, OF PHARR, TEXAS

SCRAPER FOR SUBGRADING MACHINES

Original application filed May 3, 1930, Serial No. 449,480. Divided and this application filed May 23, 1931. Serial No. 539,607.

This invention relates to the grading machine which forms the subject-matter of my copending application filed May 3, 1930, and serially numbered 449,480, now Patent No. 1,818,457, of August 11, 1931, and through the medium of which irrigation and other canals, embankments, roads, streets and the like may be finely sub-graded to prepare them for the placement of concrete linings.

The grading machine comprises a truck adapted for movement in the path located at the side of and parallel to the axis of the canal or the like to be sub-graded, rails at right angles to the axis of the canal or the like and extending across the truck and therefrom into the canal or the like, a wheeled scraper mounted on the rails, means carried by the truck for moving the scraper along the rails in the direction of the truck, and means for dumping the scraper when it reaches a position above the truck.

The present invention which constitutes a division of my earlier application, relates to the scraper, and has for one of its objects to provide a device of this character which shall embody a wheeled truck, and a scoop mounted on the truck for adjustment to permit its cutting depth to be regulated and controlled.

The invention has for a further object to provide a scraper of the character stated which shall embody means through the medium of which the scoop may be easily and quickly adjusted to regulate its cutting depth and through the medium of which the scoop may be firmly secured in adjusted position.

The invention consists in the construction, combination and arrangement of parts hereinafter fully described and claimed, and illustrated in the accompanying drawings, wherein:—

Figure 1 is a top plan view of the scraper.

Figure 2 is a view in rear elevation of the scraper.

Figure 3 is a view partly in vertical section and partly in end elevation of the scraper.

Figure 4 is a view partly in top plan and partly in horizontal section of an end portion of the scraper, and Figure 5 is a view in end elevation of the truck of the scraper.

The scraper comprises a truck 1 and a scoop 2. The truck 1 comprises a front axle 3, front wheels 4 loose on the axle, a rear axle 5, and rear wheels 6 loose on this axle. The axles 3 and 5 are connected by bars 7 in which the ends of the axles are journaled. The front wheels 4 are larger diametrically than the rear wheels 6 and both the front and rear wheels are preferably grooved for the reception of the rails 8 upon which the truck is mounted and which extend transversely of the canal, embankment, road, street or the like to be sub-graded. The scoop 2 which is of the fresno type, is carried by the truck 1 between the axles 3 and 5, and extends from a point close to one of the rails 8 to a point close to the other of the rails. The scoop 2 comprises a bottom wall 9, a rear wall 10, and end walls 11. The scoop 2 is pivotally connected, as at 12, to the rear axle 5, and is connected to the front axle 3 by pinions 13 fixed to this axle and rack teeth 14 carried by the front edges of the end walls 11 of the scoop.

The rack teeth 14 constantly mesh with the pinions 13, and are arranged in the arc of a circle having the rear axle 5 for its center. The cutting edge 15 of the scoop 2 extends downwardly and forwardly from the bottom of the scoop, and the rack teeth 14 extend upwardly from the cutting edge. The pinions 13 and the rack teeth 14 provide means through the medium of which the scoop 2 may be rocked upwardly and downwardly upon the rear axle 5, to the end that the depth of the penetration of the ground by the cutting edge 15 of the scoop may be varied.

A ratchet wheel 16 is fixed to one end of the front axle 3 outwardly of the adjacent front wheel 4 and end bar 7, and is provided with an annular series of openings 17 which as the ratchet wheel is turned register respectively with an opening 18 in said end bar. The ratchet wheel 16 is provided with a hub 19 through the medium of which it is fixed, as at 20, to the front axle 3. A lever 21 is pivoted at one end upon the hub 19 outwardly of the ratchet wheel 16, and it extends from the hub to a point radially beyond the ratchet wheel and the adjacent front wheel 4. The lever 21 is provided at its inner side with a hook 22 which embraces the periphery of the ratchet wheel 16 and which supports a dog 23 for sliding movement into and out of engagement with the teeth of the ratchet wheel. A finger lever 24 is pivoted, as at 25, to the inner side of the lever 21, and is connected by a rod 26 to the dog 23. A spring 27 positioned between the levers 21 and 24 serves to constantly urge the dog 23 in the direction of the ratchet wheel 16. The ratchet wheel 16, the lever 21, and the dog 23 provide means through the medium of which the front axle 3, and consequently the pinions 13, may be turned to effect the raising or lowering of the cutting edge 15 of the scoop 2.

A pin 28 passing through one of the openings 17 of the ratchet wheel 16 and through the opening 18 of the adjacent end bar 7, serves to secure the scoop 2 in its adjusted position.

Cables 29 are secured, as at 30, to the end bars 7, the connection between the cables and end bars being preferably located at the upper sides of said bars and centrally between the ends thereof. The scoop 2 is provided with a handle 31 which extends centrally and rearwardly from the rear end wall thereof.

In practice, the rails 8, which function as grade guides, are let into the bottom and side of the canal or the like to a depth corresponding to the depth of the ground to be removed to effect the grading operation. The scraper is then moved on the rails 8 to the point where the grading is to be started, and after this has been done the scoop 2 is adjusted to position its cutting edge 15 at the proper position with respect to the bases of the grade rails. The scraper is then moved in the opposite direction on the rails through the medium of the cables 29 which, to effect this operation of the scraper, are wound on drums carried by a truck movable along side the canal or the like, as set forth in my earlier application. When the scraper reaches the point where its load is to be dumped, it may be automatically or manually rocked upwardly and forwardly on its front wheels 4. When the scraper is manually dumped it is rocked through the medium of its handle 31.

While we have described the principle of the invention, together with the structure which we now consider the preferred embodiment thereof, it is to be understood that the structure shown is merely illustrative and that such changes may be made, when desired, as fall within the scope of the invention as claimed.

What is claimed is:—

1. A scraper of the character set forth, comprising a truck embodying front and rear axles and wheels loose on the axles, a scoop having a cutting edge, means pivotally connecting the scoop at its rear side to the rear axle, rack teeth carried by the scoop, pinions fixed to the front axle and meshing with the rack teeth, means for turning the front axle to effect the adjustment of the scoop about its pivot, and means for securing the front axle against accidental turning movement.

2. A scraper of the character set forth, comprising a tank embodying front and rear axles, bars connecting the axles and wheels loose on the axles, a scoop provided with a cutting edge, means pivotally connecting the scoop at its rear side of the rear axle, rack teeth carried by the scoop, pinions fixed to the front axle and meshing with the rack teeth, a ratchet wheel fixed to the front axle, ratchet wheel turning means, and means engaging the ratchet wheel and one of said bars to secure the front axle against accidental turning movement.

3. A scraper of the character set forth, comprising front and rear wheels, an axle carried by the front wheels, a scoop having a cutting edge, means pivotally connecting the scoop at its rear side to the rear wheels, rack teeth carried by the scoop, pinions fixed to the axle and meshing with the rack teeth, means for turning the axle to effect the adjustment of the scoop about its pivot and means for securing the axle against accidental turning movement.

In testimony whereof we hereunto affix our signatures.

ROBERT W. BRIGGS.
JOE N. SUMMERS.